US005983916A

United States Patent [19]

Daul et al.

[11] Patent Number: 5,983,916

[45] Date of Patent: Nov. 16, 1999

[54] UPGRADE OF BELOW GRADE FILL TO AT GRADE FILL

[75] Inventors: Charles M. Daul, Libertyville; Paul A. Sivak, Compton; David Lyzinski, Wheaton; Albert J. Kovach, Sugar Grove, all of Ill.

[73] Assignee: BP Amoco Corporation, Chicago, Ill.

[21] Appl. No.: 09/000,890

[22] Filed: Dec. 30, 1997

Related U.S. Application Data

[60] Provisional application No. 60/034,104, Dec. 31, 1996.

[51] Int. Cl.[6] .......... B65G 5/00

[52] U.S. Cl. .......... 137/15; 137/363; 137/371

[58] Field of Search .......... 137/363, 371, 137/15

[56] References Cited

U.S. PATENT DOCUMENTS

| | | | |
|---|---|---|---|
| 5,058,633 | 10/1991 | Sharp | 137/371 |
| 5,372,453 | 12/1994 | Argandona | 137/371 |

FOREIGN PATENT DOCUMENTS

| | | | |
|---|---|---|---|
| 2527565 | 12/1983 | France | 137/363 |

*Primary Examiner*—A. Michael Chambers
*Attorney, Agent, or Firm*—Robert A. Yesukevich; Robert E. Sloat

[57] ABSTRACT

A method of upgrading a below grade fill to prevent accidental release harmful materials from contaminating the soil below grade.

1 Claim, 3 Drawing Sheets

UPGRADE OF BELOW GRADE FILL TO AT GRADE FILL

CROSS REFERENCE TO RELATED APPLICATIONS

This application claims the benefit of U.S. Provisional Application No. 60/034,104, filed Dec. 31, 1996.

FIELD OF THE INVENTION

The invention relates to service station fill systems, more particularly to the upgrading of existing below grade fills to grade-level status to prevent environmental contamination without extensive mechanical changes or any concrete disruption.

BACKGROUND OF THE INVENTION

Below grade fills are currently in use at many service stations. These fills are located below the surface of the pavement and have spill protection. Typically there exists an annular space between the spill containment and the manhole access. This annular space is a conduit to the soil beneath the pavement for spills that either overflow the spill containment or that fall outside of the containment due to the connecting or disconnecting of the fuel transfer hose or any other spills that occur on the concrete. See FIG. 1 for an illustration of such a below grade fill.

A secondary containment system is a system that collects and contains fluids that leak out of another and primary containment system. For example, a primary containment system may store, pump and deliver hydrocarbon fuels, such as gasoline and diesel oil, at a fueling station. A secondary containment system collects and contains that same fuel if a primary tank, pump or delivery pipe should rupture or otherwise spill the gasoline. A secondary containment system also catches fuel that spills when a fill tube runs over while a fuel storage tank is being filled, for example. While the invention is described hereinafter in connection with a hydrocarbon fuel filling station storage and delivery system, it should be understood that the invention may also be used to protect any other suitable primary containment system.

With the advent of more stringent environmental regulation, it is important to attempt to contain any fuel spillage and prevent passage of such spillage to the ground, where absorption can require removal an treatment of the contaminated ground material. Hence, it is highly desirable to provide a secondary containment system for spillage from a below grade fill.

SUMMARY OF THE INVENTION

The invention involves two steps to upgrade a below grade spill in a manner that will prevent spills from entering the soil below the pavement. The first step entails filling the annular space with a gasoline and other hydrocarbon resistant rubber compound, or any suitable gasoline and other hydrocarbon resistant, flexible material to seal the annular space in a manner that prevents excessive spills from contaminating the soil below the pavement. This is illustrated in FIG. 2. The material used to fill the annular space must adhere to the spill container and to the sidewall of the manhole and be flexible enough to provide an effective seal if movement of the spill container occurs. This material must not shrink away from any surface and be fully resistant to hydrocarbon fuels, especially gasolines of all grades. The second step of the invention relates to replacing the existing cover with a water resistant cover. The water resistant cover is set into the ridge of the existing manhole and caullked with a sealant. The cover is held in place with several set screws which set into the original manhole. A removable lid is then installed, as illustrated in FIG. 3.

DETAILED DESCRIPTION OF THE PREFERRED EMBODIMENT

Figure 1:
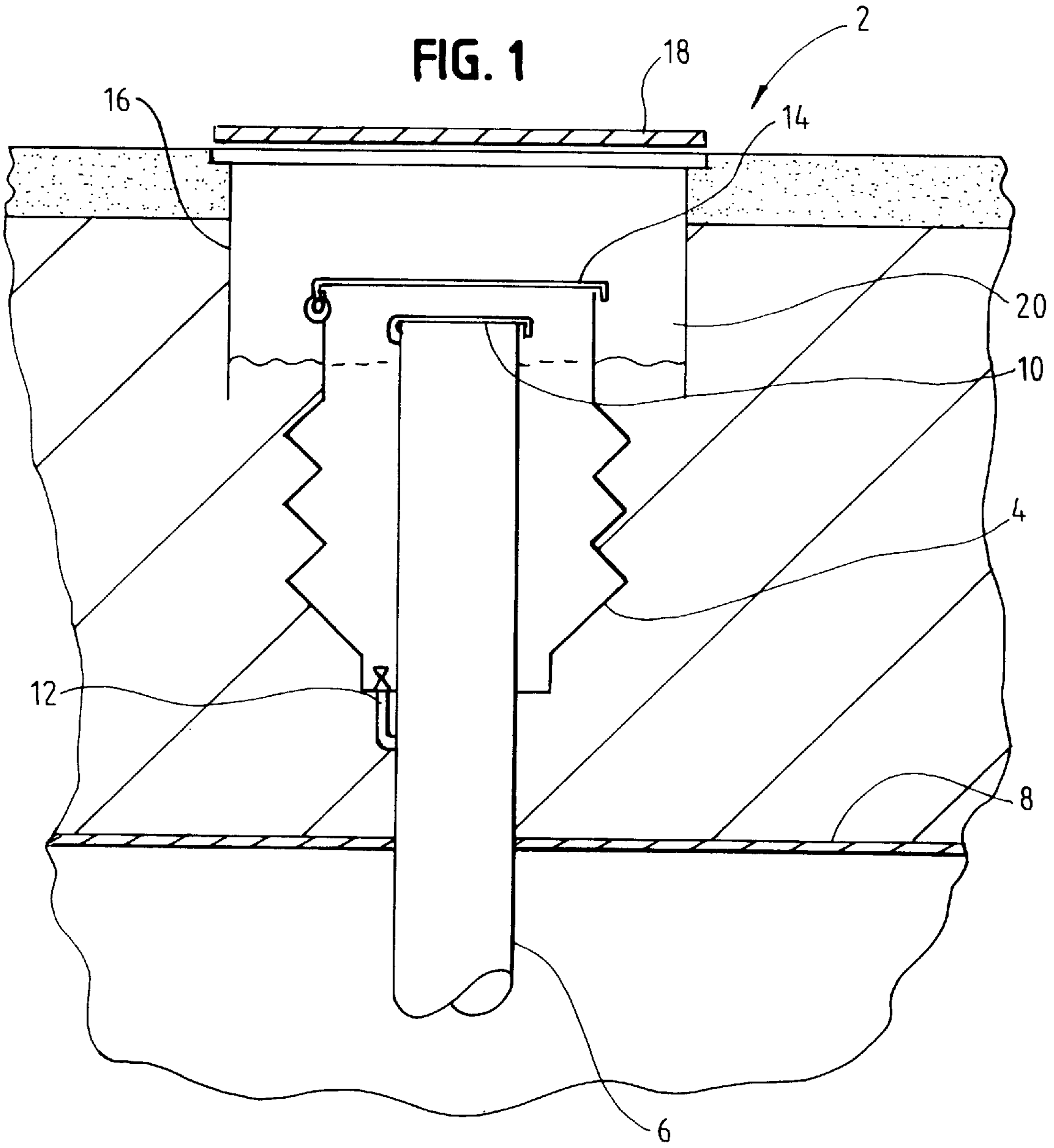
FIG. 1 shows a cut away view of a typical below grade fill.

FIG. 1 shows a cut away view of a typical below grade fill 2. A spill container 4 is attached to a fill pipe 6 for an underground storage tank 8 to contain spills that occur when a fill hose (not shown) is connected and disconnected to an inlet 10 of the fill pipe 6. The spill container 4 is drained to the fill pipe 6 with a manual or automatic valve 12. The spill container 4 is typically covered with a hinged lid 14, commonly referred to as a "toilet seat." An access manhole 16 is large enough to allow easy access to the fill pipe 6 and is protected with a cover 18 that typically comprises steel plate or fiberglass reinforced plastic (FRP.) Annular space 20 between the spill container 4 and the inner sidewall surface of the manhole 16 is generally filled with sand or gravel to allow water to drain to the soil below the pavement.

The preferred method of upgrading a below grade fill to at grade status comprises a two step process. Referring to FIG. 1, the existing below grade fill is first prepared by removing all debris from the annular space 20 and then removing all loose rust from the upper portion of the spill container 4 and from the upper portion of the inner sidewall surface of the manhole 16.

Figure 2:
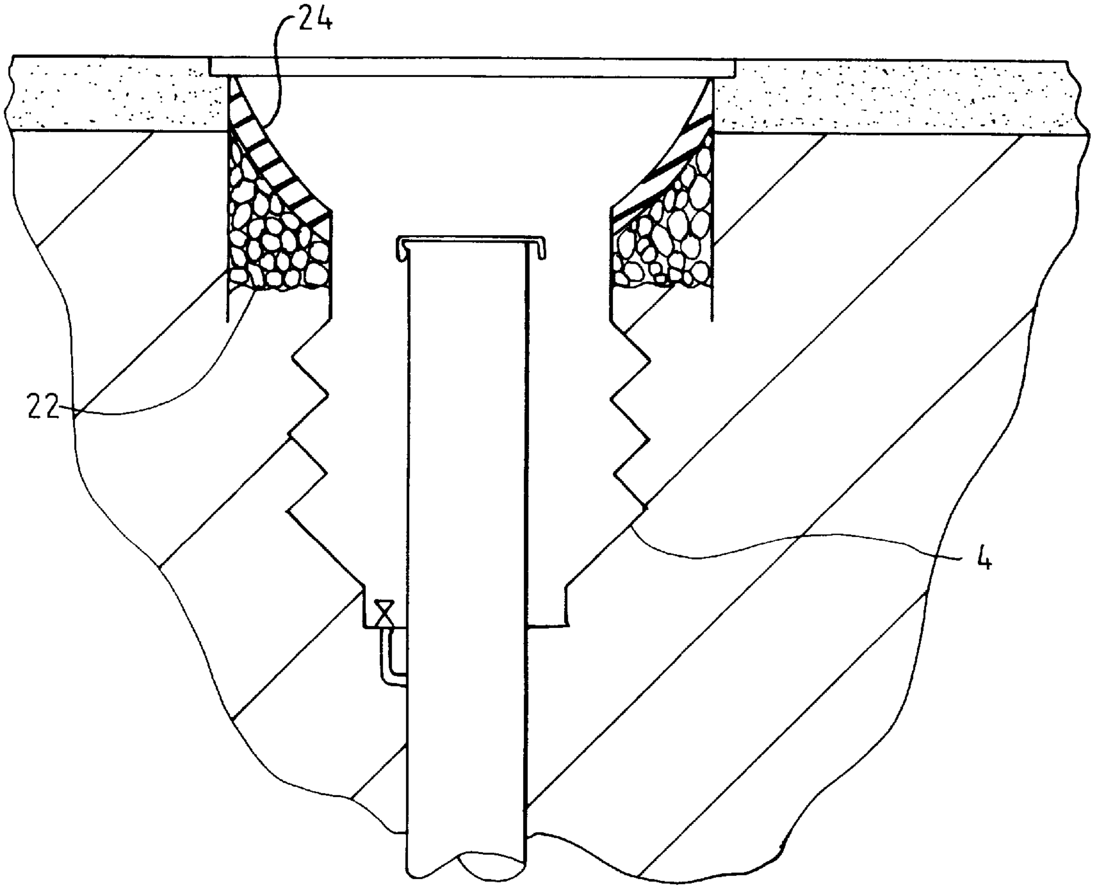
FIG. 2 shows the first step of the upgrade process.

FIG. 2 shows the first step of the upgrade process. The "toilet seat" lid 14 is permanently removed from the spill container 4. The annular space 20 between the spill container 4 and the inner sidewall surface of the manhole 16 is filled with sand or gravel to about an inch from the top of the spill container and sloped somewhat upward toward the inner sidewall surface of the manhole 16 to form a bowl-like support surface 22. A gasoline and other hydrocarbon resistant elastomeric or polymeric material, and preferably a two-part rubber formulation, such as Morton Thiokol 2235, is then mixed and shaped into place on top of the support surface 22 to form a bowl-shaped barrier 24 starting from the top edge of the inner sidewall surface of the manhole 16 and sloping towards the top edge of the spill container 4. This allows all spills or drips to drain into the spill container 4.

Figure 3:
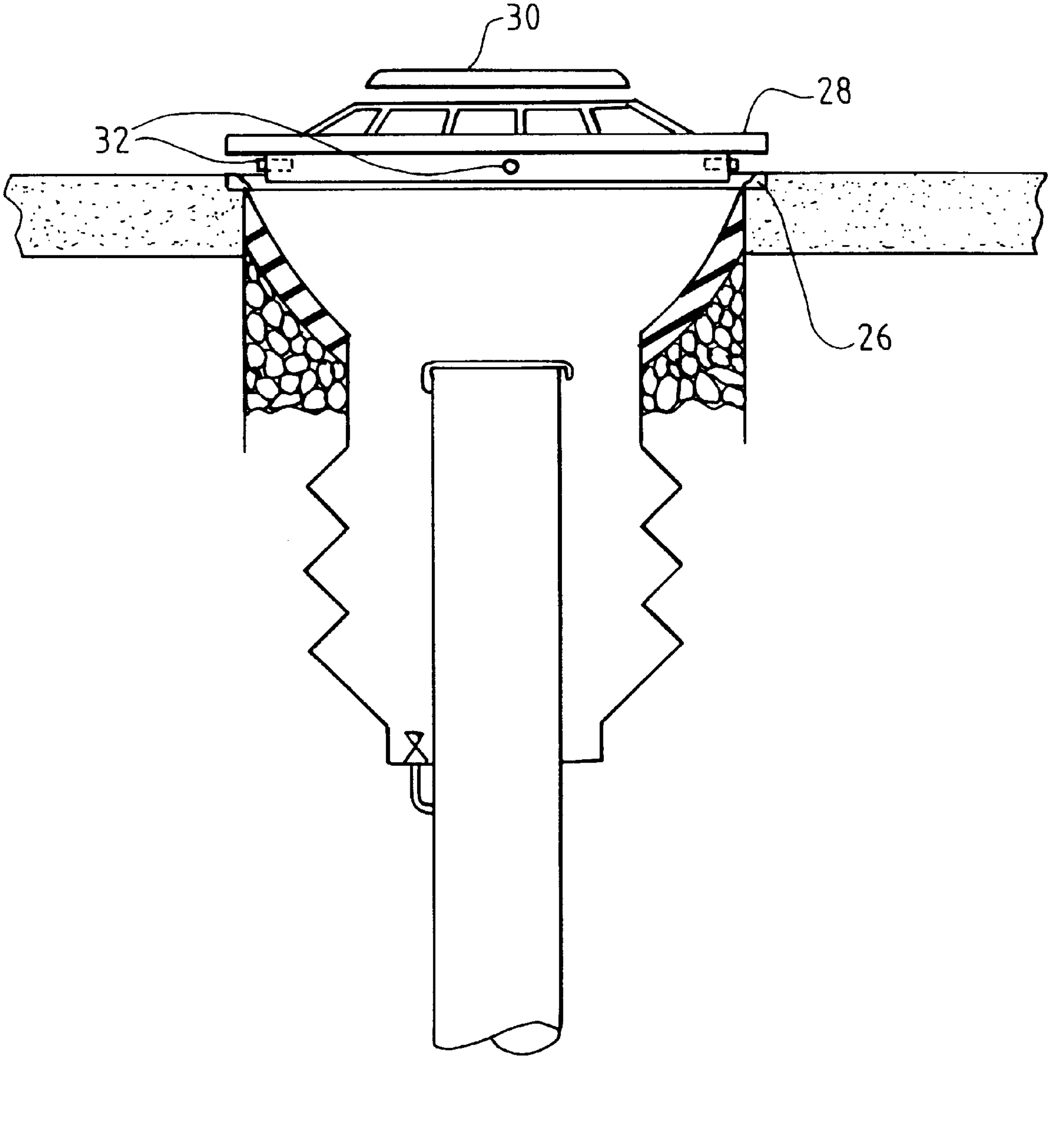
FIG. 3 shows the second step of the upgrade process.

FIG. 3 shows the second step of the upgrade process. A small amount of the uncured rubber compound described above is applied to an existing seating groove 26 for the original manhole cover 18 and a rim 28 is fit in place, being sealed by the rubber in the groove. The rim 28 comprises a base of the same diameter and thickness as the original manhole cover 18. An opening in the base of the rim 28 has a raised ridge to resist entry of water and is fitted with an easy to remove cover 30. The opening is offset from center to accommodate any offset in the fill pipe with respect to the manhole. Once in place, set screws 34 are tightened to keep the new rim from moving.

While only certain embodiments have been set forth, alternative embodiments and various modification will be apparent from the above description to those skilled in the art. These alternatives are considered equivalents and within the spirit and scope of the present invention.

What is claimed is:

1. A method of upgrading a below grade fuel tank fill to grade-level status, comprising the steps of:

filling an exposed annular space between a fill pipe spill container and a manhole sidewall within said tank fill to form an annular support surface;

shaping a self-supporting elastomeric material over said annular support surface extending from a fill pipe to said manhole sidewall for said below grade fill to form a bowl-shaped barrier that seals said annular space;

replacing a standard manhole cover for said tank fill with an annular rim sealed over said manhole that has an opening with a raised ridge; and placing a moveable lid for fill pipe access over said raised ridge of said rim to provide a water resistant covering for said manhole.

* * * * *